(12) United States Patent
Kindt et al.

(10) Patent No.: US 6,864,920 B1
(45) Date of Patent: Mar. 8, 2005

(54) HIGH VOLTAGE RESET METHOD FOR INCREASING THE DYNAMIC RANGE OF A CMOS IMAGE SENSOR

(75) Inventors: Willem J. Kindt, Sunnyvale, CA (US); Christina P. Phan, San Jose, CA (US); Shivani Gupta, Milpitas, CA (US)

(73) Assignee: Eastman Kodak Company, Rochester, NY (US)

( * ) Notice: Subject to any disclaimer, the term of this patent is extended or adjusted under 35 U.S.C. 154(b) by 670 days.

(21) Appl. No.: 09/939,217

(22) Filed: Aug. 24, 2001

(51) Int. Cl.[7] .............................................. H04N 5/335
(52) U.S. Cl. ....................................................... 348/308
(58) Field of Search ................................ 348/308, 307, 348/302; 250/208.1; 257/292, 291

(56) References Cited

U.S. PATENT DOCUMENTS

| | | | | |
|---|---|---|---|---|
| 5,465,054 A | * | 11/1995 | Erhart | .......................... 326/34 |
| 5,578,957 A | | 11/1996 | Erhart et al. | |
| 5,604,449 A | | 2/1997 | Erhart et al. | |
| 6,344,877 B1 | * | 2/2002 | Gowda et al. | ............... 348/308 |
| 6,369,853 B1 | * | 4/2002 | Merrill et al. | ............... 348/308 |
| 6,642,543 B1 | * | 11/2003 | El Gamal et al. | ............ 257/291 |
| 6,720,592 B1 | * | 4/2004 | Kindt et al. | ............. 250/208.1 |

* cited by examiner

*Primary Examiner*—Aung Moe
(74) *Attorney, Agent, or Firm*—Peyton C. Watkins

(57) ABSTRACT

A circuit and method for increasing the dynamic range of CMOS image sensors designed with a thin gate oxide layer. The circuit includes a high voltage supply circuit and a high voltage level shifter circuit. The high voltage supply circuit is configured to supply a voltage to the shifter circuit. The voltage has a voltage level higher than the maximum supply voltage of the associated fabrication process. The shifter circuit is configured to output a high reset signal based on a reset signal generated to reset a pixel circuit of a pixel array. Instead of the reset signal, the high reset signal is coupled to a gate of the reset transistor in the pixel circuit. The high reset signal allows the reset transistor to maintain a gate to source potential less than the maximum supply voltage even when the high reset signal is greater than the maximum supply voltage.

21 Claims, 11 Drawing Sheets

HIGH VOLTAGE RESET METHOD FOR INCREASING THE DYNAMIC RANGE OF A CMOS IMAGE SENSOR

FIELD OF THE INVENTION

The present invention relates generally to CMOS image sensors, and more particularly to integrated CMOS transistor logic circuits for increasing the dynamic range of the CMOS image sensor.

BACKGROUND OF THE INVENTION

Digital cameras have become extremely common lately. There are two prevalent technologies used in digital cameras: charge-coupled device (CCD) image sensors and complimentary metal-oxide semiconductor (CMOS) image sensors. Both of these image sensors depend on the photovoltaic response resulting when silicon is exposed to light. The photons in the light have energy that breaks covalent bonds in the silicon. The electrons that are released when the covalent bonds are broken result in a photocurrent when an electric field carries the electrons away. A photodiode may collect the photocharge carried in the photocurrent, thus providing a detectable signal. The dynamic range of the image sensor is the ratio of the largest detectable signal to the smallest detectable signal.

The photocharge, and thus, the detectable signal, depends on the quantum efficiency which is defined as the ratio of collected electrons to the incident photons. Because CMOS image sensors have several transistors for each pixel, many of the photons hit these transistors rather than the photodiode. In contrast, CCD image sensors have few transistors. Thus, currently, CCD image sensors have a superior dynamic range in comparison to CMOS image sensors. However, CCD image sensors are much more expensive to manufacture than CMOS image sensors. Therefore, it is very desirable to use CMOS image sensors in consumer products.

One reason that CMOS image sensors are less expensive to manufacture than CCD image sensors is because they use the same fabrication processes as other chips, such as microprocessors, application specific integrated circuits (ASICs) and the like. Therefore, research and development costs associated with improving the fabrication process benefit all the technologies, including the CMOS image sensor technology. Briefly, for a P-channel enhancement-type MOSFET, the fabrication process involves diffusing two P-regions, called the source and the drain, side by side into a surface of an N-type silicon slice. A layer of insulating silicon oxide (i.e., gate oxide) is grown over the surface. Two strips of metal are made to penetrate through windows in the oxide and to contact the silicon. A third metal strip, the gate, lies on top of the oxide, over the gap between the P regions. When a negative voltage is applied to the gate, an electric field is produced. The strength of the electric field is equal to the power supply (VCC) divided by the thickness (d) of the gate oxide.

One of the improvements in the fabrication process has concentrated on reducing the thickness of the gate oxide. This improvement increases the processing power per unit area of the MOSFET device and increases the processing speed. While the increased processing power and processing speeds are advantageous to many of the technologies using CMOS chips (i.e., microprocessors), the thinner gate oxide results in a decreased dynamic range for image sensors using the CMOS chips. This decreased dynamic range results in less contrast detail appearing in pictures having both dark and light areas.

SUMMARY OF THE INVENTION

The present invention is directed at a system and method for increasing the dynamic range of CMOS image sensors designed with a thin gate oxide layer. In this regard, the present invention provides a high voltage reset for each pixel in the CMOS image sensor. Even though the high voltage reset for the in-pixel transistor is above the supply rating of the fabrication process associated with the in-pixel transistor, the present invention prevents damage to the in-pixel transistors.

In one embodiment, the high voltage reset circuit includes a high voltage supply circuit and a high voltage level shifter circuit. The high voltage supply circuit is configured to supply a high supply voltage to the high voltage level shifter circuit. The high supply voltage has a voltage level higher than the maximum supply voltage of the associated fabrication process (e.g., 0.35 micron). The high voltage level shifter circuit is configured to output a high reset signal based on a reset signal generated to reset a pixel circuit of a pixel array. Instead of the reset signal, the high reset signal is coupled to a gate of the reset transistor in the pixel circuit. The high reset signal allows the reset transistor to maintain a gate to source potential less than the maximum supply voltage even when the high reset signal is greater than the maximum supply voltage. The reset transistor is coupled to a cathode of a photodiode in the pixel circuit. During the high reset signal, a potential on the cathode of the photodiode charges up to a supply voltage of the associated fabrication process.

In one aspect of the invention, the high voltage level shifter circuit includes several dual gate oxide transistors on a dual gate oxide CMOS chip. The dual gate oxide transistors include two p-channel transistors, an input pair of n-channel transistors, and a p-channel transistor and an n-channel transistor configured as an inverter. The high supply voltage is the supply voltage associated with the dual gate oxide transistors.

In another aspect of the invention, the high voltage level shifter circuit includes several supertransistors. Each of the supertransistors includes an input shielding transistor, a switching transistor, and an output shielding transistor.

In yet another aspect of the invention, the high voltage supply circuit includes a high voltage charge pump.

In still another aspect of the invention, the high reset signal includes at least two voltage states. The first state is associated with a first voltage level which is less than the maximum supply voltage. The final state is associated with a final voltage level which is greater than the maximum supply voltage. The final voltage level may be substantially equal to the sum of the maximum supply voltage and at least one threshold voltage of the reset transistor in the pixel circuit. The at least two voltage states may include many voltage states such that the high reset signal becomes a gradually increasing voltage signal.

In another embodiment of the invention, a high voltage reset method for increasing the dynamic range of a CMOS image sensor is provided. The high voltage reset method includes applying a first voltage to a gate of a reset transistor of a pixel and applying at least one subsequent voltage to the gate. Each of the subsequent voltages has an increased voltage level. One of the subsequent voltages is a final voltage. The final voltage level has a voltage level that is greater than a maximum supply voltage associated with a CMOS fabrication process used for the CMOS image sensor. The first and each of the subsequent voltages are applied in such a manner to prevent gate oxide breakdown on the gate when the increased voltage level is above the maximum supply voltage associated with the CMOS fabrication process.

In one aspect of the invention, there are two voltage levels with the second voltage level corresponding to the final voltage. In another embodiment, the subsequent voltages may represent a gradually increasing voltage signal. The gradually increasing voltage signal has a slow low to high transition such that a potential on a photodiode in the pixel and a source of the reset transistor follow the first and subsequent voltages.

In yet another embodiment of the invention, a circuit for increasing a dynamic range of an image sensor is provided. The circuit includes a means for generating a high supply voltage, a means for receiving a reset signal and a means for generating a high reset signal based on the reset signal and the high supply voltage. The high supply voltage has a higher voltage level than a maximum supply voltage of an associated fabrication process used for the image sensor. The high reset signal is coupled to a gate of a reset transistor in a pixel circuit of a pixel array. The high reset signal allows the reset transistor to maintain a gate to source potential less than the maximum supply voltage while a potential on a cathode of a photodiode charges up to a supply voltage associated with the associated fabrication process.

DETAILED DESCRIPTION OF THE PREFERRED EMBODIMENT

Briefly described, the present invention is directed at a system and method for increasing the dynamic range of CMOS image sensors designed with a thin gate oxide layer. As mentioned above, the fabrication process for CMOS chips continues to progress towards smaller dimensions. These smaller dimensions require smaller maximum supply voltages which decrease the ability of a pixel ell to detect contrast details in both bright and dark regions of a sensed image (i.e., the dynamic range). For a pixel cell with a relatively low dynamic range, either the dark regions of the sensed image will be underexposed or the bright regions will be overexposed. This phenomenon is best described using a conventional CMOS image sensor as illustrated in FIGS. 1–3.

Figure 1:
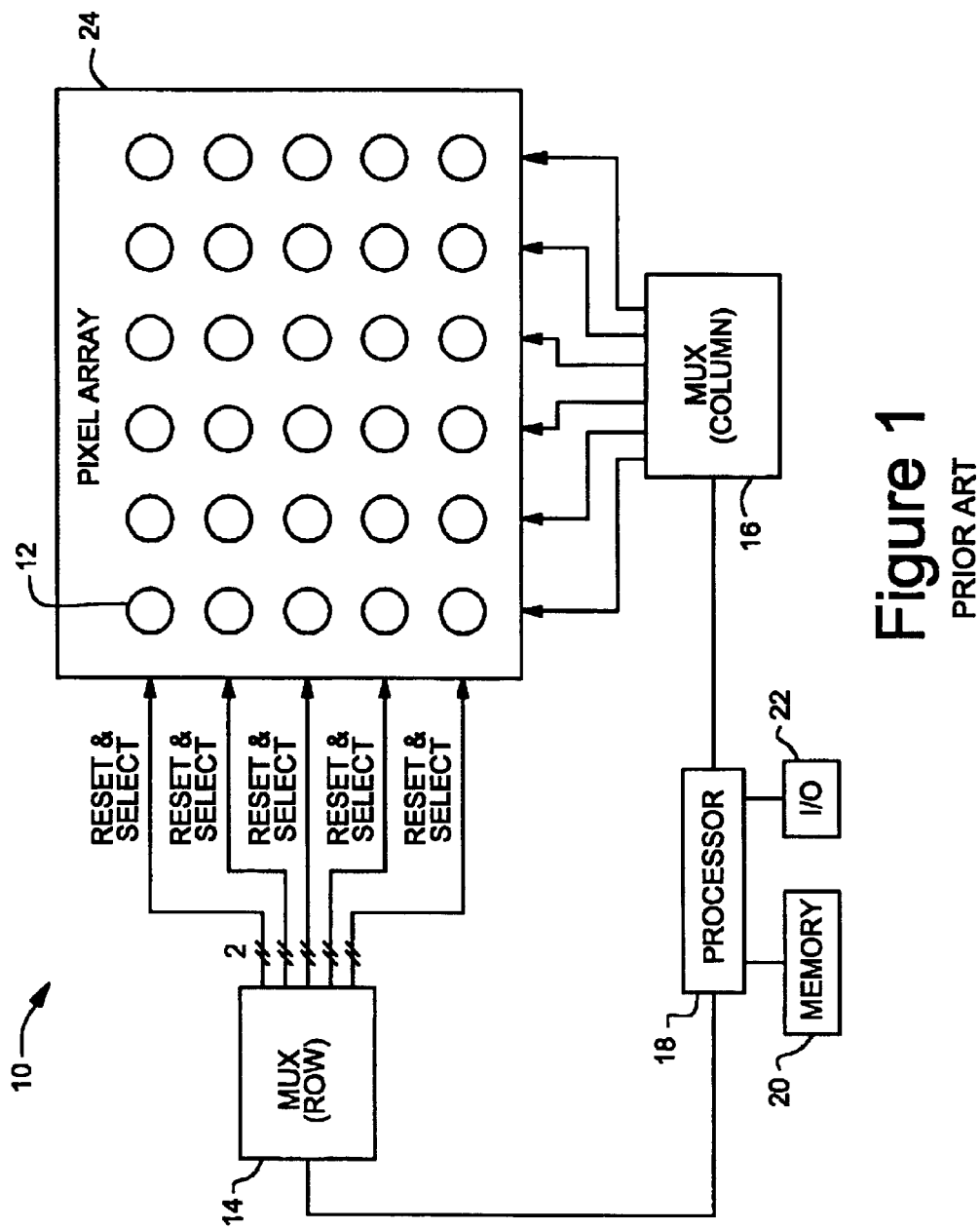
FIG. 1 is a block diagram of conventional components for an image sensor.

FIG. 1 shows a conventional CMOS image sensor 10, which includes an array 24 of individual pixel cells 12 arranged in columns and rows. A processor 18 is coupled to an input/output interface 22, a memory 20 and a row multiplexer 14, which is employed to reset and select each row of the pixel cell array 24. The processor 18 is also coupled to a column multiplexer 16 that is employed to read the value at each column for a selected row of pixel cells 12.

Figure 2:
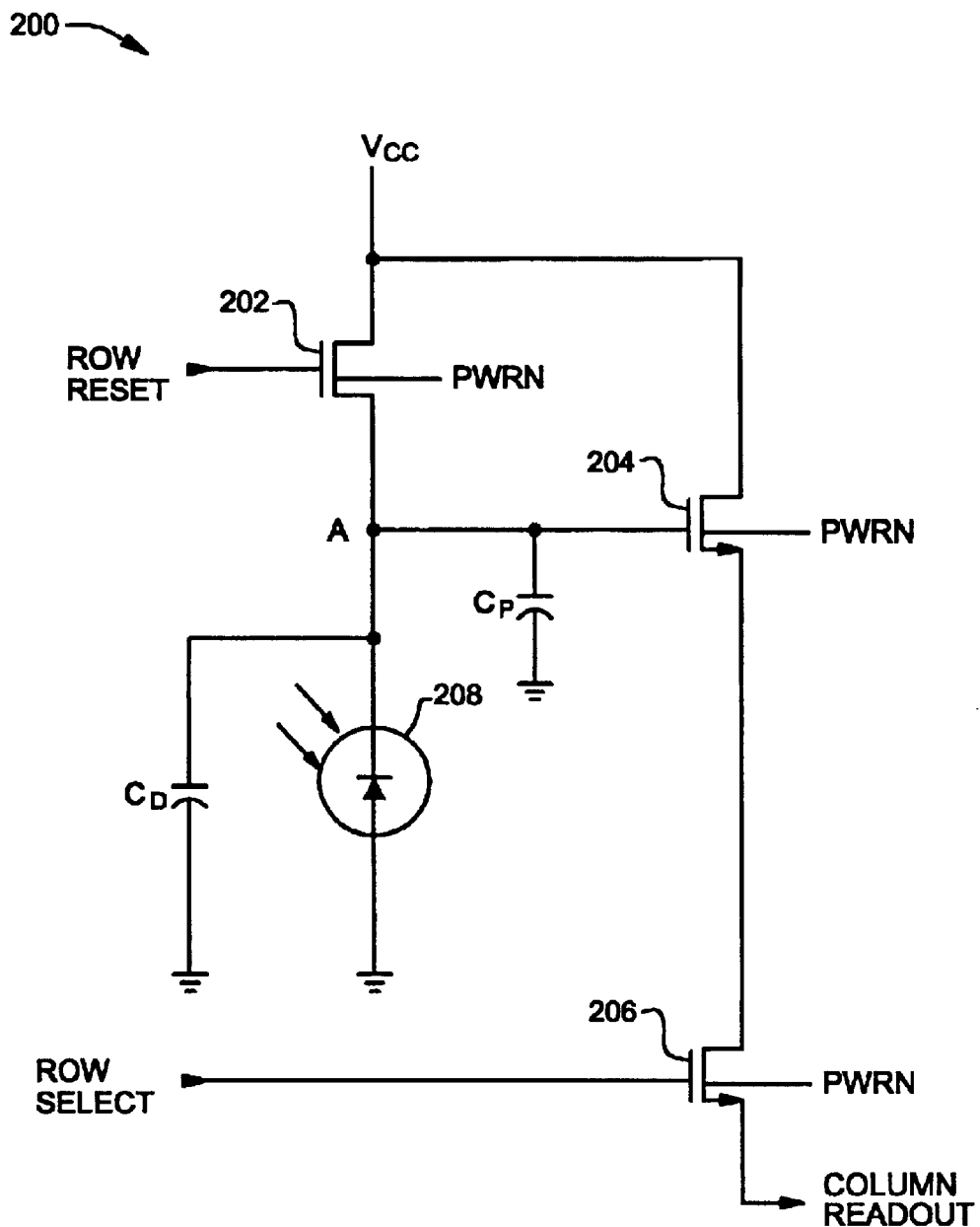
FIG. 2 is a schematic diagram of a conventional pixel cell architecture for one of the individual pixel cells shown in FIG. 1.
Figure 3:
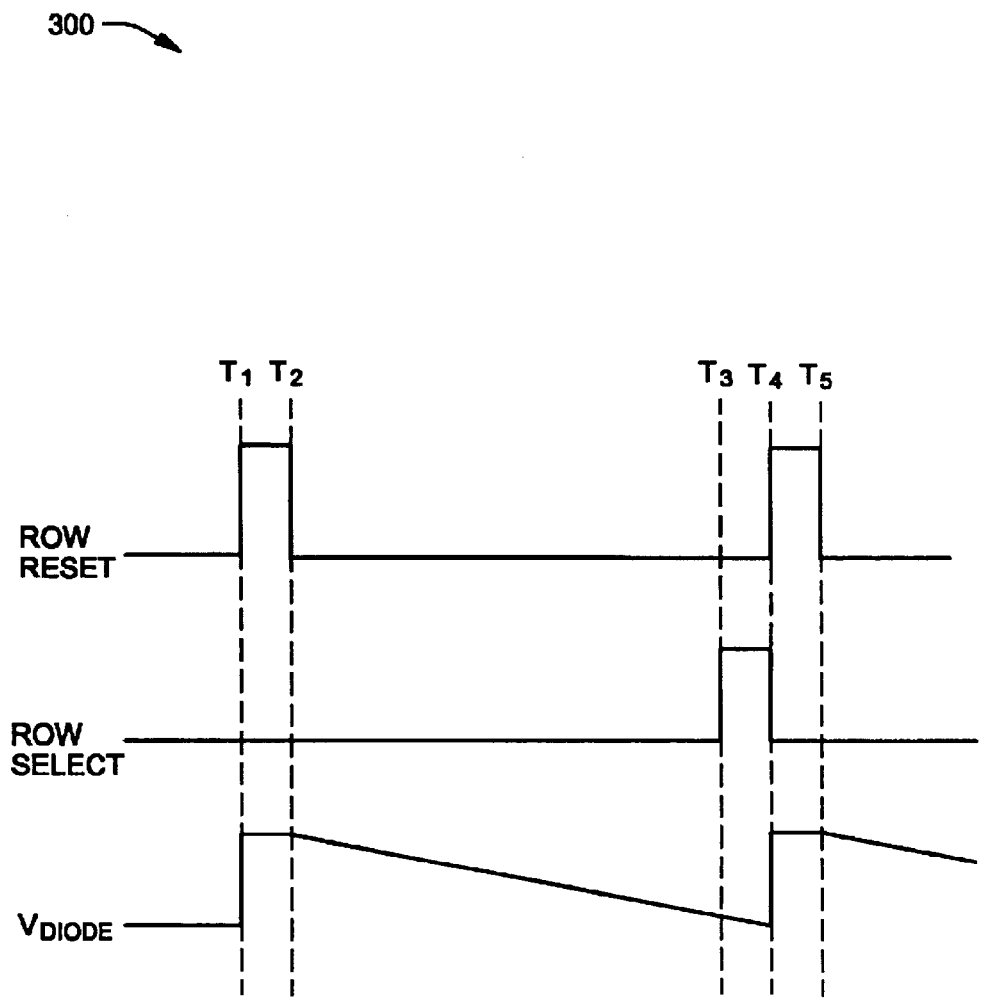
FIG. 3 is a timing diagram illustrating ideal voltage waveforms generated by the conventional image sensor depicted in FIG. 1.

FIG. 2 illustrates a schematic overview 200 of a conventional pixel cell architecture for one of the individual pixel cells 12 shown in FIG. 1. The pixel cell architecture includes three transistors and will be hereinafter referred to as a 3-T pixel cell. The 3-T pixel cell includes a photodiode 208, an NMOS transistor 202, an NMOS transistor 204 and an NMOS transistor 206. The transistor 202 is employed to reset the pixel cell, transistor 204 operates as a source follower voltage buffer and transistor 206 is employed to select the pixel cell. The drains of transistor 202 and transistor 204 are coupled to the positive rail of the power supply (Vcc). The drain of transistor 206 is coupled to the source of transistor 204. The source of transistor 202 is coupled to the gate of transistor 204 and the cathode of the photodiode 208 at Node A.

A parasitic capacitance (CP) at the gate of transistor 204 and a depletion layer capacitance (CD) of photodiode 208 appear at node A. The gate of transistor 202 is coupled to a reset line and the gate of transistor 206 is coupled to a select line. The bodies of transistors 202, 204 and 206 are coupled to the substrate at PWRN. Also, the anode of the photodiode 208 is coupled to the substrate.

FIG. 3, in conjunction with FIG. 2, illustrate the general operation of the 3-T pixel cell. At time $T_1$, a positive pulse is applied to the gate of reset transistor 202 so that a positive bias voltage is applied at the cathode of the photodiode 208 and the depletion layer capacitance ($C_D$) of the photodiode will charge up. After the reset transistor 202 turns off at time $T_2$, photodiode 208 remains biased at the positive bias voltage because of the charge stored in its depletion layer capacitance (CD). However, when photons (light) are incident on photodiode 208, a photocurrent (not shown) will flow from the cathode to the anode of the photodiode. The photocurrent discharges the photodiode's depletion layer capacitance (CD) and causes the voltage across the photodiode 208 to drop. At time $T_3$, after a certain time interval (i.e., the integration time), a positive pulse (i.e., row select) is applied to the gate of row select transistor 206. This connects the output of source follower transistor 204 to the column readout line so that the output signal voltage ($V_{DIODE}$) can be read out through the source follower transistor 204 on the column line at the source of the select transistor 206. The cycle then repeats at time $T_4$. One skilled in the art will appreciate that correlated double sampling may occur after time $T_5$. The correlated double sampling compares the pixel reset level and the pixel signal level after the row select pulse. This helps reduce the fixed pattern noise.

In general, the dynamic range of a sensing system is defined as the ratio of the largest detectable signal to the smallest detectable signal and is usually expressed in decibels (dBs). For a CMOS image sensor having the 3-T architecture illustrated in FIG. 2, the largest and smallest detectable signals are both represented by a voltage across photodiode 208. Thus, the voltage swing across photodiode 208 and the noise level of the pixel affect the dynamic range of the CMOS image sensor.

The voltage swing is the difference between the maximum voltage and the minimum voltage on the cathode of the photodiode. The maximum voltage on the cathode of the photodiode equals the supply voltage minus a threshold voltage across reset transistor 202 (Vcc−Vth). The minimum voltage on the cathode of the photodiode equals at least one threshold voltage (Vth) of the source follower transistor 204. Any lower voltage on the cathode of the photodiode will not operate the source follower transistor 204 and will not allow the output signal voltage $V_{DIODE}$ to be read. Thus, the voltage swing equals (Vcc−Vth)−Vth, which is the same as Vcc−2*Vth.

The minimum detectable signal level depends on the noise level of the pixel. Because the depletion layer capacitance (CD) of the photodiode 208 can not be reset to a certain potential with unlimited accuracy, the noise level is usually dominated by kT/C reset noise (k is Boltzman's constant, T is the temperature in Kelvin and C is the capacitance of the capacitor). The dynamic range is limited by the square root (SQRT) of kT/C and is 20*log[Vs/SQRT(kT/C)] in which Vs is the signal swing. This voltage noise corresponds to a minimum detectable exposure. Any optical exposures smaller than this noise limit will be indistinguishable from the noise of the pixel.

Based on the foregoing, the present invention is directed at improving the dynamic range of the pixel cell by increasing the voltage swing. The invention focuses on increasing the maximum voltage on the cathode of the photodiode without compromising real estate on the CMOS chip. One method of increasing the maximum voltage on the cathode is to use a PMOS transistor for reset transistor 202. Then, the voltage on the cathode of the photodiode could be pulled up to VCC without losing a threshold voltage. However, PMOS devices consume too large of an area for use in pixels of a commercial image sensor. Thus, the present invention provides another method for improving the voltage swing. This other method, hereinafter referred to as the high voltage reset method, takes into account the waveforms used on the reset lines of the image sensor in order to improve the dynamic range of the pixel. The invention allows CMOS chips with small geometries and low supply voltages to achieve a greater dynamic range than in the past. Those skilled in the art will appreciate that CMOS geometries are typically expressed as the minimum length of the transistor gate that can be fabricated. All other critical dimensions are proportional to the length of the gate in some fashion.

In the following discussion, a 0.35 micron CMOS process is used as an example of a low-voltage fabrication process. The 0.35 micron CMOS process uses a supply voltage of 3.3 volts and has a maximum supply voltage of 3.6 volts. Without the present invention, the maximum voltage on the cathode of the photodiode is approximately 2.1 volts when the gate of the reset transistor is pulled up to 3.3 volts on reset. In order to ensure a good reset, it is desirable for the gate of the reset transistor to be pulled to at least 1.2 volts above the reset potential. However, 4.5 volts is much larger than the maximum supply voltage of 3.6 volts and would permanently damage or adversely affect the reliability of the image sensor if it were used. Therefore, current CMOS image sensors only apply a 3.3 volt reset pulse to the gate of the reset transistor. In contrast, the present invention provides a high voltage reset method that allows the reset pulse applied to the gate of the reset transistor to be greater than the maximum supply voltage. Even though the reset pulse is greater than the maximum supply voltage, the high voltage reset method of the present invention insures that the reset transistor is not damaged.

Figure 4:
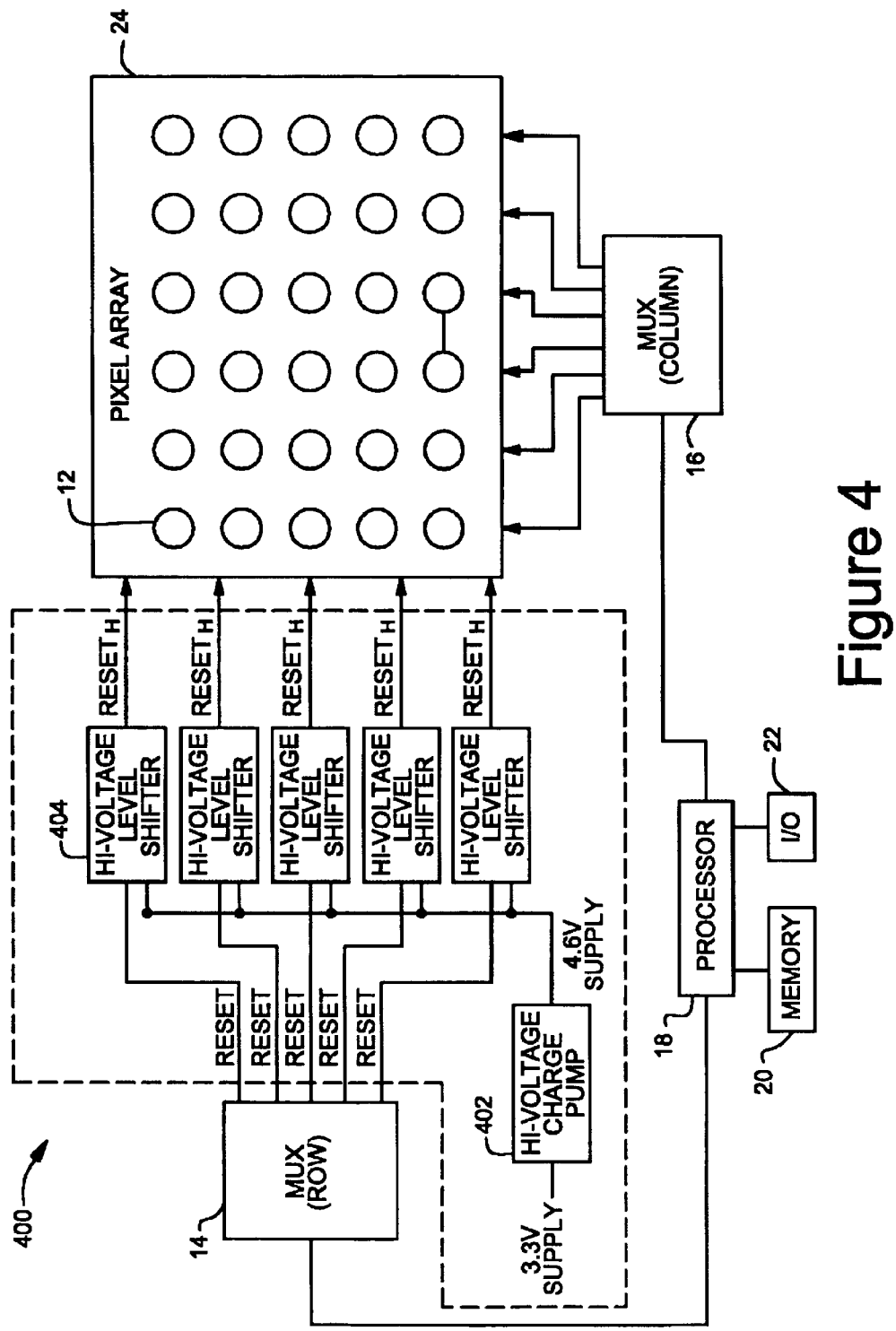
FIG. 4 is a block diagram of an exemplary embodiment of several components for an image sensor in accordance with the present invention.

FIG. 4 is a block diagram of an exemplary embodiment of several components for an image sensor employing a high voltage reset method in accordance with the present invention. The components responsible for the high voltage reset method are shown generally within the crosshatched area. Otherwise, components illustrated in FIG. 1 and described above, have like reference numerals in FIG. 4. One skilled in the art will appreciate that the row select output generated by mux 14 is omitted in FIG. 4 so that the reset signals are more easily shown. As shown, the image sensor 400 of the present invention includes a high voltage charge pump 402 and a plurality of high voltage level shifter circuits 404. High voltage charge pump 402 accepts a supply voltage input (i.e., a 3.3 volt supply voltage) and supplies a higher supply voltage output (i.e., 4.5 volt supply voltage). The higher supply voltage output is supplied to each of the high voltage level shifter circuits 404. In addition, each of the high voltage level shifter circuits 404 accepts a reset signal (RESET) from mux 14 that corresponds to one of the rows of pixels 12. Based on these inputs, each high voltage level shifter circuit 404 generates a high voltage reset signal (RESET$_H$ for one of the rows in the pixel array.

The high voltage level shifter circuits 404 are designed in manner such that the low to high transition of the high voltage reset signal (RESET$_H$) to the reset transistor will be slow. This guarantees that the potential on the photodiode and the source of the reset transistor can follow the potential on the reset line. This prevents the breakdown of the gate oxide in the reset transistor even when the potential on the gate is larger than the maximum supply voltage.

The high voltage charge pump 402 and high voltage level shifter circuits 404 may implement any of a number of high voltage design methods. For more information on one illustrative high voltage design method, please refer to U.S. Pat. No. 5,465,054, entitled "High Voltage CMOS Logic Using Low Voltage CMOS Process", and assigned to Vivid Semiconductor, Inc.

Figure 5:
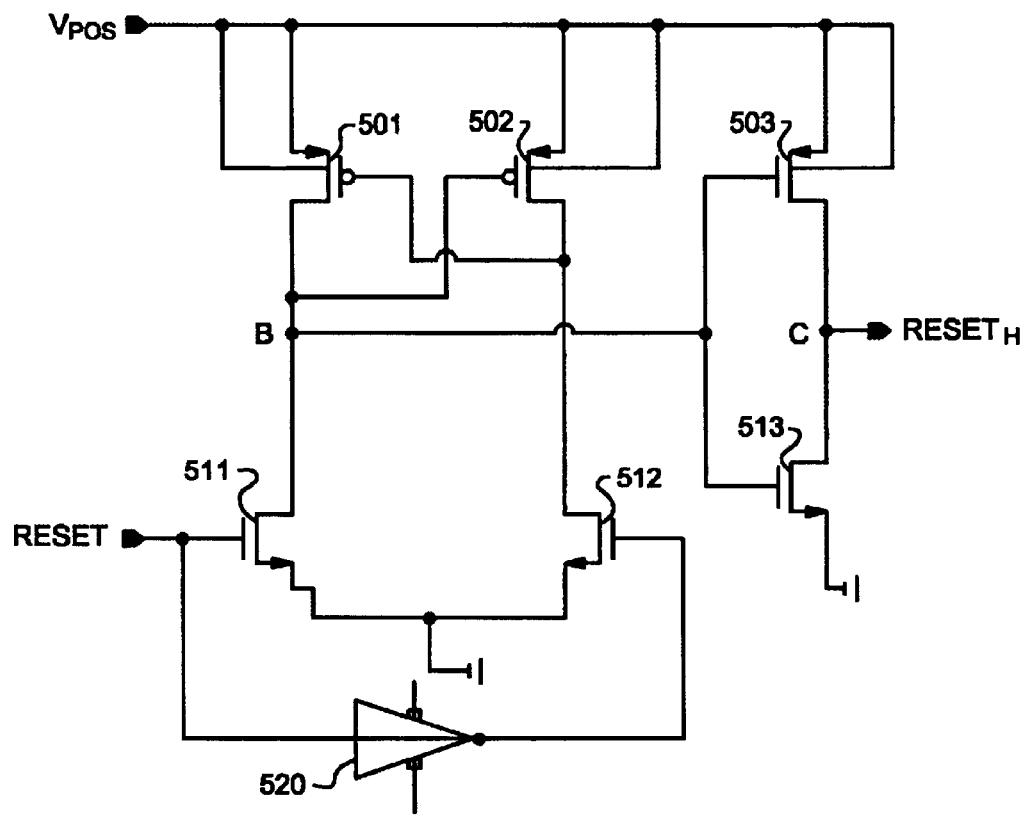
FIG. 5 is a schematic diagram of one embodiment of the high voltage level shifter circuit shown in FIG. 4 implementing a slow rise high voltage output.

FIG. 5 is schematic diagram of one embodiment of the high voltage level shifter 404 shown in FIG. 4 that implements a slow rise high voltage output (RESET$_H$) using a dual gate oxide (DGO) CMOS chip. In the fabrication process for the DGO CMOS chip, two different types of transistors may be created: the original (intrinsic) transistors and the DGO transistors. The DGO transistors have a thicker gate oxide and the minimum dimensions are comparable to the 0.35 micron process whereas the intrinsic transistors are 0.18 micron. Typically, a dual gate oxide (DGO) CMOS chip is fabricated by adding a special process module to the existing fabrication process. The special process module is commonly referred to as the DGO (Dual Gate Oxide) module.

For this embodiment using the dual gate oxide CMOS chip, pixels could be designed using the smaller intrinsic transistors of the process and the DGO high voltage level shifter circuit 500 could be designed with the dual gate oxide transistors having a higher supply voltage. For example, the smaller intrinsic transistor may have a maximum supply voltage of 1.8 volts and the dual gate oxide transistors may have a maximum supply voltage of 3.5 volts. One advantage of using this high voltage design technique is that the pixels can be very small because they are using the smaller transistors. However, the dynamic range of the pixel is the same as a 0.35 micron pixel because the charge pump function and level shifter circuit use the 0.35 micron transistors which use a higher supply voltage. For this embodiment, the charge pump 402 function may be implemented by using the larger supply voltage associated with the dual gate oxide transistor as the supply voltage (VPOS) in the DGO high voltage level shifter circuit 500.

The DGO high voltage level shifter circuit 500 includes two p-channel CMOS transistors 501 and 502, an input pair of n-channel CMOS transistors 511 and 512, and a p-channel CMOS transistor 503 and n-channel CMOS transistor 513 configured as an inverter. In this example, it will be assumed that each of the above transistors use one of the dual gate oxide transistors produced using a dual gate oxide CMOS process (e.g., 1.8 volt and 3.5 volt). The bulk connection for the p-channel transistors 501, 502 and 503 are coupled to the power supply (VPOS) associated with the dual gate oxide CMOS process. While VPOS may range up to 3.5 volts, in the following discussion, VPOS is 2.5 volts. The bulk connection and the drain terminals for the n-channel transistors 511, 512 and 513 are all grounded.

The source terminals of p-channel transistors 501, 502 and 503 are each coupled to VPOS. The gate terminal of p-channel transistor 501 is coupled to the drain terminal of p-channel transistor 502 and the drain terminal of n-channel transistor 512. The drain terminal of p-channel transistor 501 is coupled, at node B, to the gate terminal of p-channel transistor 502 and the drain terminal of n-channel transistor 511. In addition, the gate terminals of p-channel transistor 503 and n-channel transistor 513 are coupled at node B. The drain terminals of p-channel transistor 503 and n-channel transistor 513 are each coupled at node C and provide the output RESET$_H$ of the high voltage level shifter 404 shown in FIG. 4.

The gate terminal of n-channel transistor 511 is coupled to the input of inverter 520 and is configured to receive the reset signal RESET from the multiplexer 14 shown in FIG. 4. Because the pixels in the pixel array use the smaller transistors of the dual gate oxide CMOS chip, the reset signal RESET ranges from 0.0 to 1.8 volts. However, as will be described below, the output RESET$_H$ from the DGO high voltage level shifter circuit 500 ranges from 0.0 to 3.3 volts. Thus, the voltage across the drain to source of n-channel transistor 513 remains less than the process limitation voltage and transistor 513 will not breakdown.

In general, input signal RESET is approximately a square wave ranging from 0.0 volts to 1.8 volts. When RESET is approximately 0.0 volts, n-channel transistor 511 is turned off. The output of inverter 520 is high (i.e., 1.8 volts) which turns on n-channel transistor 512. The drain terminal of p-channel transistor 502 is pulled low. P-channel transistor 501 is turned on and Node B goes high (i.e., VPOS). The inverter pair 503 and 513 then inverts the high at Node B to a low at Node C. Thus, RESET$_H$ is 0.0 volts when RESET is 0.0 volts. Now, when RESET is high (i.e., 1.8 volts), N-channel transistor 512 is turned off and N-channel transistor 511 is turned on. This results in pulling Node B low (i.e., 0 volts). The inverter pair 503 and 513 then inverts the low at Node B to a high (i.e., VPOS) at Node C. Thus, RESET$_H$ ranges from 0.0 volts to VPOS.

Figure 6:
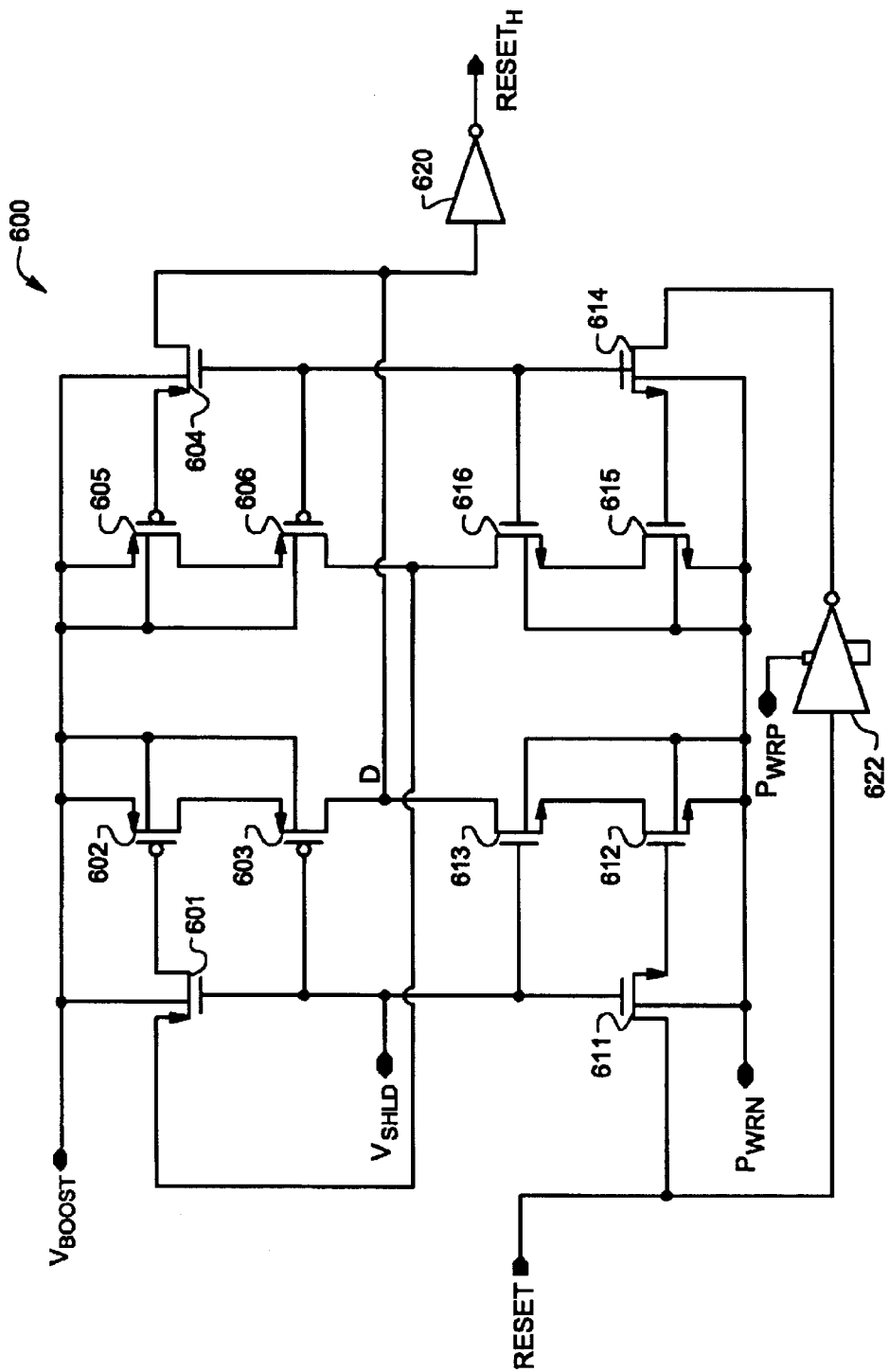
FIG. 6 is schematic diagram of another embodiment of the high voltage level shifter circuit shown in FIG. 4 also implementing a slow rise high voltage output.

FIG. 6 is a schematic diagram of another embodiment of the high voltage level shifter 404 shown in FIG. 4 that implements a slow rise high voltage output based on design methods of the aforementioned U.S. Pat. No. 5,465,054. In general, for each transistor 501, 502, 511 and 512 shown in FIG. 5, a supertransistor, which includes an input shielding transistor, a switching transistor, and an output shielding transistor, replaces the associated transistor. Thus, the high voltage level shifter circuit 600 includes a first p-channel CMOS input shielding transistor 601, a first p-channel CMOS switching transistor 602, a first p-channel CMOS output shielding transistor 603, a second p-channel CMOS input shielding transistor 604, a second p-channel CMOS switching transistor 605, a second p-channel CMOS output shielding transistor 606. These transistors correspond to the p-channel CMOS transistor 501 and the p-channel CMOS transistor 502 shown in FIG. 5.

In addition, the high voltage level shifter circuit 600 includes a first n-channel CMOS input shielding transistor 611, a first n-channel CMOS switching transistor 612, a first n-channel CMOS output shielding transistor 613, a second n-channel CMOS input shielding transistor 614, a second n-channel CMOS switching transistor 615, a second n-channel CMOS output shielding transistor 616. These transistors correspond to the n-channel input pair of CMOS transistors 511 and 512 shown in FIG. 5. High voltage level shifter circuit 600 further includes a high voltage inverter 620 and an inverter 622.

In this example, it will be assumed that each of the above transistors is produced using a typical low-voltage (e.g., 3.5 volt) CMOS process. The bulk connection for the p-channel transistors 601–606 are each coupled to a boosted supply voltage VBOOST supplied by the high voltage charge pump 402 shown in FIG. 4. The bulk connection for each of the n-channel transistors 611–616 is grounded.

The gate terminal of first p-channel output shielding transistor 603, first n-channel output shielding transistor 613, first p-channel input shielding transistor 601 and first n-channel input shielding transistor 611 is each coupled to a shield voltage (VSHLD). For the following discussion, it is assumed that VBOOST is +4.6 volts, and that the shield voltage VSHLD is midway between VBOOST and GND, or +2.3 volts. It is also assumed that the reset signal received from the multiplexer 14 shown in FIG. 4 ranges from 0 to 3.3 volts.

The drain terminal of first p-channel input shielding transistor 601 is coupled to the gate terminal of first p-channel switching transistor 602. The source terminal of first p-channel switching transistor 602 is coupled to the boosted supply voltage VBOOST. The drain terminal of first p-channel switching transistor 602 is coupled to the source terminal of first p-channel output shielding transistor 603.

The source terminal of first n-channel input shielding transistor 611 is coupled to the gate terminal of first n-channel switching transistor 612. The drain terminal of first n-channel input shielding transistor 611 is adapted to receive the reset signal RESET from the multiplexer 14 shown in FIG. 4. RESET signal is also input into inverter 622. The output of inverter 622 is coupled to the drain terminal of the second n-channel input shielding transistor 614. The source terminal of first n-channel switching transistor 612 is coupled to ground. The drain terminal of first n-channel switching transistor 612 is coupled to the source of first n-channel output shielding transistor 613.

The source terminal of the second p-channel switching transistor 605 is coupled to the boosted supply voltage VBOOST. The gate terminal of the second p-channel switching transistor 605 is coupled to the source terminal of the second p-channel input shielding transistor 604. The drain terminal of the second p-channel switching transistor 605 is coupled to the source of the second p-channel output shielding transistor 606. The drain terminal of the second p-channel input shielding transistor 604 is coupled to the drain terminals of the first p-channel output shielding transistor 603 and the first n-channel output shielding transistor 613 and to the input of the high voltage inverter 620. Output of the high voltage inverter 620 represents the high reset (RESET$_H$) shown in FIG. 4.

The gate terminal of the second p-channel input shielding transistor 604 is coupled to each of the gate terminals of the second p-channel output shielding transistor 606, the second n-channel input shielding transistor 614 and the second n-channel output shielding transistor 616. The drain terminal of the second p-channel output shielding transistor 606 is coupled to the drain terminal of the second n-channel output shielding transistor 616 and the source terminal of the first p-channel input shielding transistor 601.

Conceptually, the first p-channel CMOS input shielding transistor 601, the first p-channel CMOS switching transistor 602, and the first p-channel CMOS output shielding transistor 603 may be viewed as single transistor (i.e., supertransistor) having a gate (G) that corresponds to the drain terminal of the first p-channel CMOS input shielding transistor 601, a source (S) that corresponds to the source terminal of the first p-channel CMOS switching transistor 602, and a drain (D) that corresponds to the drain terminal of the first p-channel CMOS switching transistor 602. Likewise, each of the other three groups of three transistors (i.e., transistors 604–606, transistors 611–613, transistors 614–616) may be viewed as a supertransistor having a gate, source and drain.

Input signal RESET is approximately a square wave. For the following example, RESET ranges from 0.0 volts to 3.3 volts. Thus, RESET$_H$ ranges from 0.0 volts to VPOS. As one skilled in the art will appreciate, the operation of the high voltage level shifter circuit 600 is similar to the operation of the DGO high voltage level shifter circuit 500 illustrated in FIG. 5 and described above. The difference is in using supertransistors in place of transistors 501, 502, 511 and 512 shown in FIG. 5. For additional information on the operation of the supertransistors please refer to U.S. Pat. No. 5,465, 054, entitled "High Voltage CMOS Logic Using Low Voltage CMOS Process", and assigned to Vivid Semiconductor, Inc.

Figure 7:
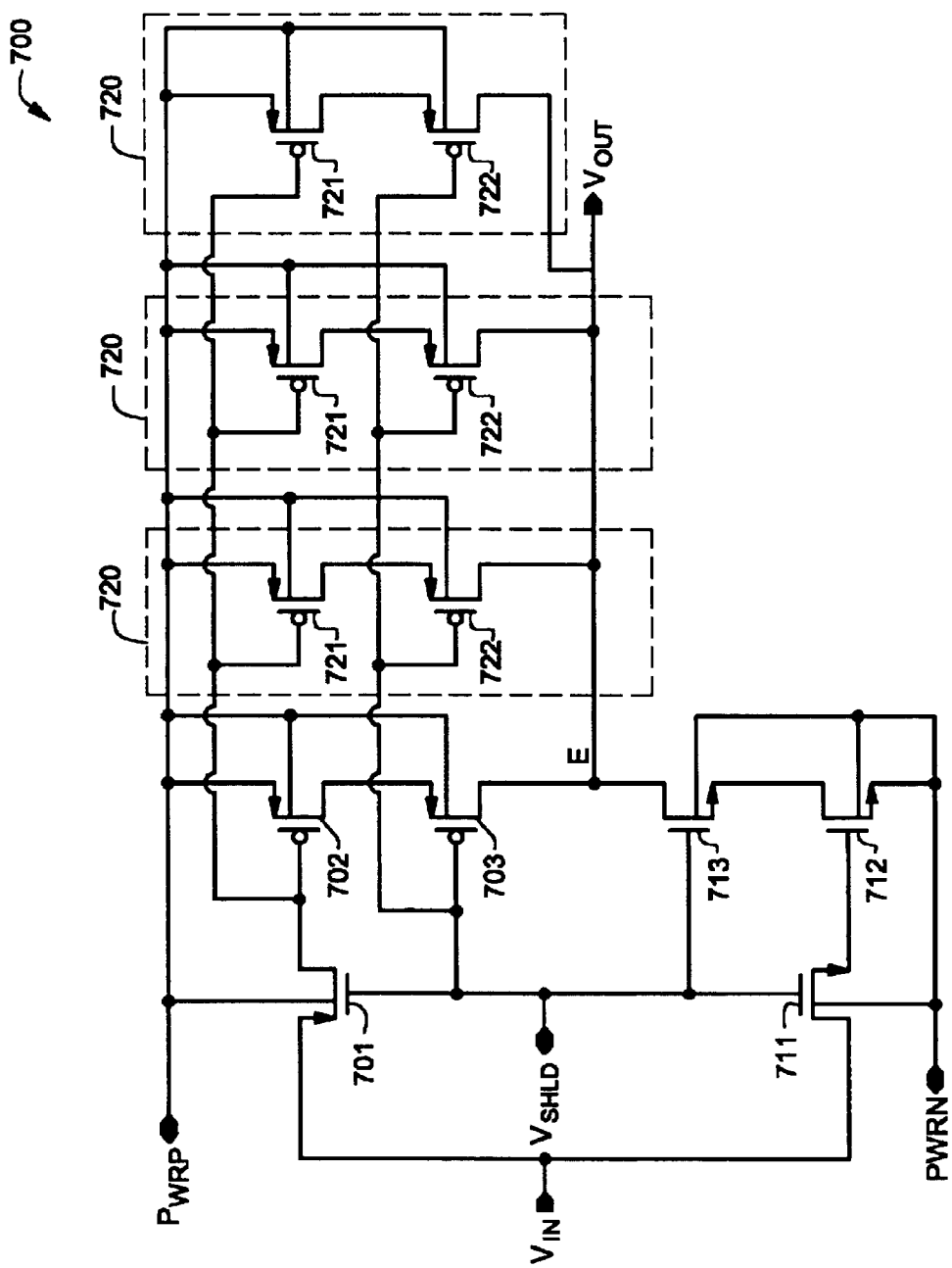
FIG. 7 is a schematic diagram of one embodiment of the high voltage inverter shown in FIG. 6.

FIG. 7 is a schematic diagram of one embodiment of the high voltage inverter 620 used in the high voltage level shifter circuit 600 shown in FIG. 6. This embodiment of the high voltage inverter 620 is based on design methods of the aforementioned U.S. Pat. No. 5,465,054. In general, the p-channel transistor 503 and n-channel transistor 513 configured as an inverter in FIG. 5, are each replaced with a supertransistor that includes an input shielding transistor, a switching transistor, and an output shielding transistor. The supertransistor replaces CMOS transistors in logic circuits to allow the circuits to operate at double the power supply voltages normally used with the CMOS device. Thus, the high voltage inverter circuit 700 includes a first p-channel CMOS input shielding transistor 701, a first p-channel CMOS switching transistor 702, a first p-channel CMOS output shielding transistor 703. These three transistors correspond to the p-channel CMOS transistor 503 shown in FIG. 5. The high voltage inverter circuit 700 also includes a first n-channel CMOS input shielding transistor 711, a first n-channel CMOS switching transistor 712, a first n-channel CMOS output shielding transistor 713. These three transistors correspond to the n-channel CMOS transistor 513 shown in FIG. 5. In addition, high voltage inverter circuit 700 may include one or more segments, generally represented within outlined box 720. Each segment 720 includes a p-channel segment switching transistor 721 and a p-channel segment output shielding transistor 722. In general, the segments 720 provide a convenient method for controlling the rise time of the RESET$_H$ signal.

Conceptually, the first p-channel CMOS input shielding transistor 701, the first p-channel CMOS switching transistor 702, and the first p-channel CMOS output shielding transistor 703 may be viewed as single transistor (i.e., supertransistor) having a gate (G) that corresponds to the drain terminal of the first p-channel CMOS input shielding transistor 701, a source (S) that corresponds to the source terminal of the first p-channel CMOS switching transistor 702, and a drain (D) that corresponds to the drain terminal of the first p-channel CMOS switching transistor 702. Likewise, the first n-channel CMOS input shielding transistor 711, the first n-channel CMOS switching transistor 712, and the first n-channel CMOS output shielding transistor 713 may be viewed as single transistor (i.e., supertransistor) having a gate (G) that corresponds to the drain terminal of the first n-channel CMOS input shielding transistor 711, a source (S) that corresponds to the source terminal of the first n-channel CMOS switching transistor 712, and a drain (D) that corresponds to the drain terminal of the first n-channel CMOS switching transistor 712.

In this example, it will be assumed that each of the above transistors is produced using a typical low-voltage (e.g., 3.5 volt) CMOS process. The bulk connection for the first p-channel input shielding transistor 701, the first p-channel switching transistor 702, the first p-channel output shielding transistor 703, the p-channel segment switching transistor 721 and the p-channel segment output shielding transistor 722 are each coupled to a boosted supply voltage VBOOST supplied by the high voltage charge pump 402 shown in FIG. 4. The bulk connection for each of the n-channel transistors 711–713 is grounded.

The gate terminal of first p-channel output shielding transistor 703, first n-channel output shielding transistor 713, first p-channel input shielding transistor 701 and first n-channel input shielding transistor 711 is each coupled to a shield voltage (VSHLD). For the following discussion, it is assumed that VBOOST is +4.6 volts, and that the shield voltage VSHLD is midway between VBOOST and GND, or +2.3 volts.

The drain terminal of first p-channel input shielding transistor 701 is coupled to the gate terminal of first p-channel switching transistor 702. The source terminal of first p-channel input shielding transistor 701 is adapted to receive input signal V$_{IN}$ which is the output of high voltage inverter 620 (FIG. 6). The drain terminal of first n-channel input shielding transistor 711 is also adapted to receive input signal V$_{IN}$. The drain terminal of first p-channel switching transistor 702 is coupled to the source terminal of first p-channel output shielding transistor 703.

The source terminal of first n-channel input shielding transistor 711 is coupled to the gate terminal of first n-channel switching transistor 712. The source terminal of first n-channel switching transistor 712 is coupled to ground. The drain terminals of first p-channel output shielding transistor 703 and first n-channel output shielding transistor 713 are coupled together and provide V$_{OUT}$.

Now, as mentioned earlier, the segments 720 provide a convenient mechanism for controlling the rise of the signal RESET$_H$. Any number of segments 720 may be added or the dimensions of the p-channel switching transistor 702 and the p-channel output shielding transistor 703 may change to control the rise of RESET$_H$. For each of the segments 720 in the high voltage inverter circuit 700, the gate terminal of the p-channel segment switching transistor 721 is coupled to the drain terminal of the first p-channel input shielding transistor 701. The source terminal of the p-channel segment switching transistor 721 is coupled to a boosted supply voltage VBOOST supplied by the high voltage charge pump 402 shown in FIG. 4. The drain terminal of the p-channel segment switching transistor 721 is coupled to the source of the p-channel segment output shielding transistor 722. The gate terminal of the p-channel segment output shielding transistor 722 is coupled to the gate terminal of the first p-channel input shielding transistor 701 and the gate terminal of the first p-channel output shielding transistor 703. The drain of p-channel segment output shielding transistor 722 is coupled, at Node E, to the drain terminal of each of the transistors 703 and 713 and provide output signal V$_{OUT}$.

In operation, when V$_{IN}$ is at 0 volts, first n-channel input shielding transistor 711 is fully conductive and will pass 0 volts to the gate of first n-channel switching transistor 712. This turns first n-channel switching transistor 712 off. The drain terminal of the first n-channel switching transistor has approximately 1.9 volts. The first p-channel input shielding transistor 701 is not fully conductive so it blocks the 0 volts from reaching the gate terminal of the first p-channel switching transistor 702. The first p-channel input shielding transistor 701 pulls the gate terminal of first p-channel switching transistor 702 to low (i.e., VSHLD plus Vtp). This renders first p-channel switching transistor fully conductive and shorts VBURST to the drain terminal of the first p-channel switching terminal 702. Thus, V$_{OUT}$ at Node E is at 4.5 volts.

When V$_{IN}$ is at 4.5 volts, first n-channel input shielding transistor 711 will pull the gate of first n-channel switching transistor 712 high (i.e., VSHLD less Vtn). This turns first n-channel switching transistor 712 on and shorts GND to the source terminal of first n-channel switching transistor 712. The first p-channel input shielding transistor 701 is conductive and shorts 4.5 volts to the gate terminal of first p-channel switching transistor 702. This renders p-channel switching transistor 702 nonconductive. Thus, V$_{OUT}$ is at Node E is at 0.0 volts.

Figure 8:
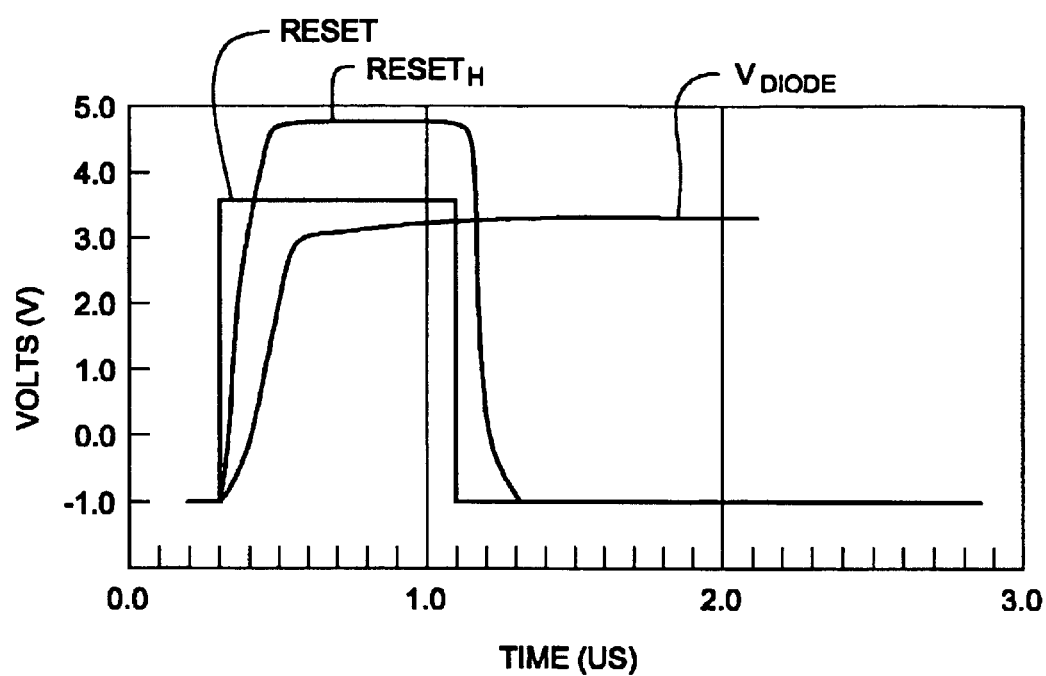
FIG. 8 is a timing diagram illustrating ideal voltage waveforms associated with the high voltage level shifter circuits depicted in either FIG. 5 or FIG. 6, along with ideal voltage waveforms associated with the photodiode depicted in FIG. 2, in accordance with the present invention.

FIG. 8 is a timing diagram illustrating ideal voltage waveforms associated with the high voltage level shifter circuit depicted in either FIG. 5 or 6, along with ideal voltage waveforms associated with the photodiode depicted in FIG. 2, in accordance with the present invention. In this embodiment, the high voltage reset is performed with a slow rising reset signal RESET$_H$ to the gate of the reset transistor 202 shown in FIG. 2. Again, the timing diagram illustrates voltage waveforms based on the 0.35 micron CMOS process or the 0.35/0.18 micron dual gate oxide CMOS process. Signal RESET is the reset signal from multiplexer 14 shown in FIG. 2. As shown, RESET is generally a square wave rising from 0.0 volts to 3.3 volts for a specified time period (i.e., 0.9 us). The high voltage level shifter circuit generates the low rising reset signal RESET$_H$ from the RESET signal and the high voltage supply V$_{BOOST}$ from the high voltage charge pump. Signal RESET$_H$ represents the voltage at the gate of the reset transistor. As shown, signal RESET$_H$ gradually rises from 0.0 volts to 4.5 volts. In response, the potential across the photodiode V$_{DIODE}$ gradually charges to 3.3 volts (i.e., the supply voltage for the 0.35 micron CMOS process). As mentioned earlier, it is desirable to have the time constant of the reset process (i.e., the charging of the photodiode) slower than the rise time of the potential on the gate of the reset transistor (i.e., reset line). As illustrated in FIGS. 5 and 6, the slow rise of RESET$_H$ may be accomplished by using a small pull up transistor and relying on the capacitance associated with the reset line.

Figure 9:
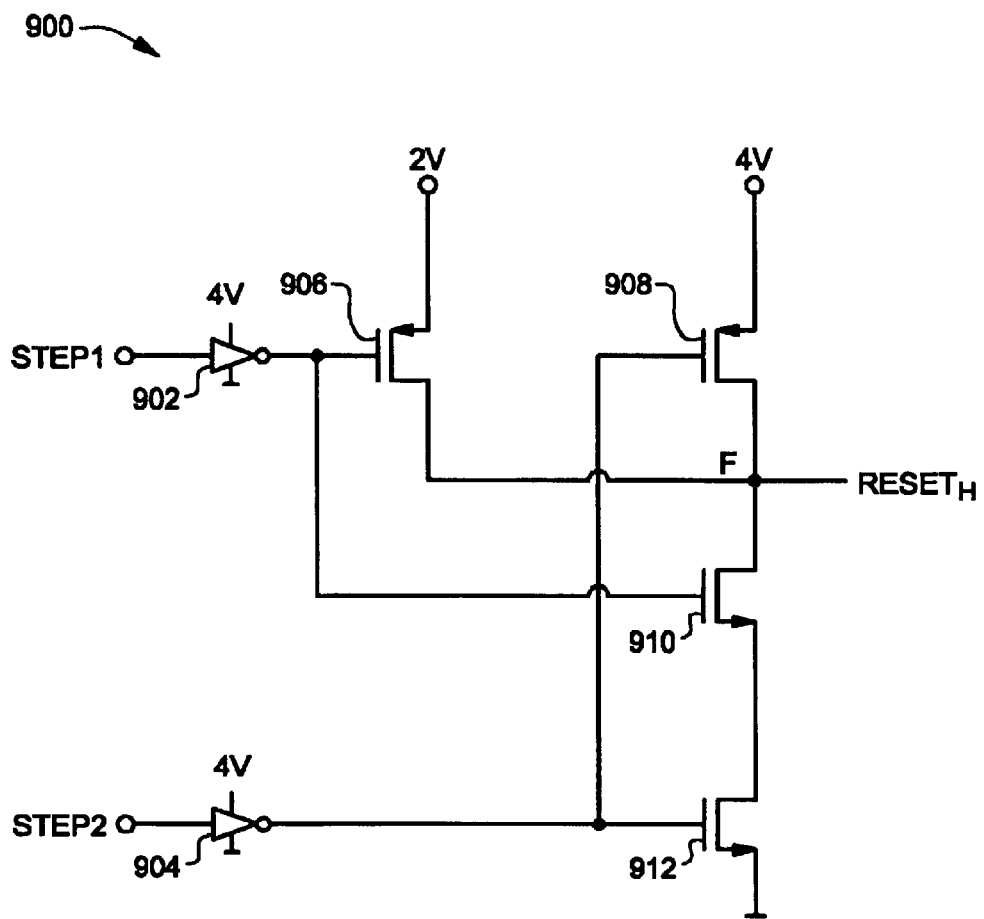
FIG. 9 is a schematic diagram of an embodiment of the high voltage level shifter circuit shown in FIG. 4 implementing a two-step high voltage output.

FIG. 9 is a schematic diagram of an embodiment of the high voltage level shifter circuit shown in FIG. 4 implementing a two-step high voltage output. For this embodiment, the high voltage charge pump 402 and the high voltage level shifter 404 are implemented in a dual gate oxide CMOS chip. As mentioned above, in this embodiment, pixels could be designed using the smaller intrinsic transistors and the high voltage level shifter circuit and the charge pump could be designed with the dual gate oxide transistors. One advantage of using this high voltage design technique is that the pixels can be very small because they are using the smaller transistors, but the dynamic range of the pixel is the same as a 0.35 micron pixel because the charge pump and level shifter circuit use the 0.35 micron transistors which provide a higher supply voltage. In addition, if the analog front end and the analog to digital converter for the image sensor already use a dual gate oxide CMOS chip, there is no additional cost for supporting the level shifter circuit and the charge pump with the dual gate oxide transistors. For this embodiment, the charge pump 402 function may be implemented by coupling the larger supply voltage of the dual gate oxide transistor to the level shifter circuit. In addition, for this embodiment, the level shifter circuit may be designed using the DGO transistors rather than the supertransistors illustrated in FIGS. 6 and 7 and described above.

The two-step high voltage level shifter circuit 900 includes two high voltage inverters 902 and 904. These high voltage inverters 902 and 904 may be designed as illustrated in FIG. 5 and described above. The two-step high voltage level shifter circuit 900 further includes two PMOS transistors 906 and 908 and two NMOS transistors 910 and 912. The gate of the first PMOS transistor is coupled to the output of the first high voltage inverter 902. The gate of the first NMOS transistor is also coupled to the output of the first high voltage inverter 902. The source of the first PMOS transistor 906 is coupled to a first power supply voltage (i.e., 2 volts). The gate of the second PMOS transistor 908 is coupled to the output of the second high voltage inverter 904. The gate of the second NMOS transistor 912 is also coupled to the output of the second high voltage inverter 904. The source of the second PMOS transistor 908 is coupled to a second power supply voltage (i.e., 4 volts) of the dual gate oxide CMOS chip. The drain of both the first and second PMOS transistors 906 and 908 are coupled, at Node F, to the drain of the first NMOS transistor 910. The RESET$_H$ signal is output at Node F. The source of first NMOS transistor 910 is coupled to the drain of the second NMOS transistor 912. The source of the second NMOS transistor 912 is coupled to ground.

The two PMOS transistor 906 and 908 in this modified nand gate pulls RESET$_H$ up to both 2 volts and 4 volts during STEP1 and STEP2, respectively. When neither STEP1 nor STEP2 is active, the two NMOS transistors 910 and 912 pull RESET$_H$ down to 0 volts. In operation, the gate of each of the two PMOS transistor 906 and 908 is driven to the largest output signal and is inverted. The two high voltage inverters 902 and 904 invert the logic level of STEP1 and STEP2, respectively, and also shift the input logic levels. For example, the two high voltage inverters 902 and 904 may shift the input logic levels from 0 to 2 volts to a larger swing of 0 to 4 volts.

Figure 10:
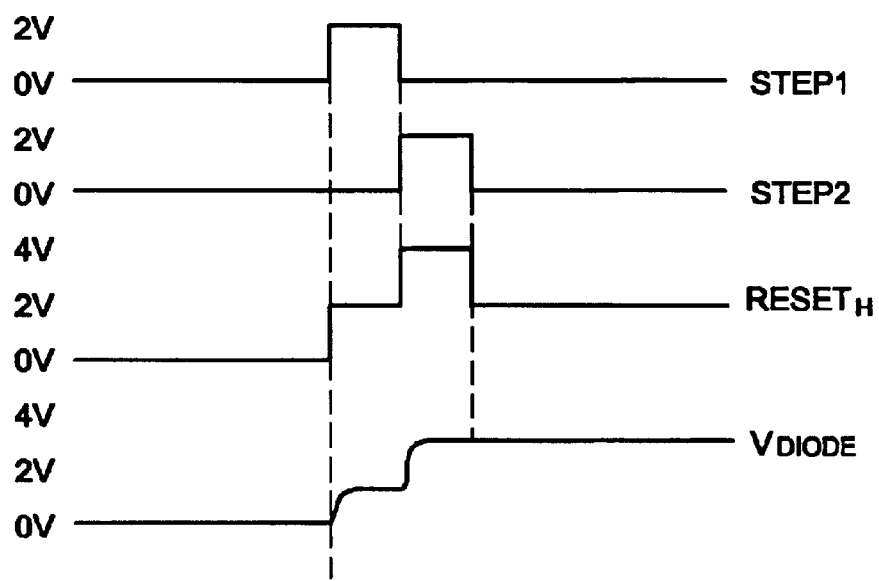
FIG. 10 is a timing diagram illustrating ideal voltage waveforms associated with the high voltage level shifter circuit depicted in FIG. 9, along with ideal voltage waveforms associated with the photodiode depicted in FIG. 2, in accordance with the present invention.

FIG. 10 is a timing diagram illustrating ideal voltage waveforms associated with the two-step high voltage level shifter circuit depicted in FIG. 9, along with ideal voltage waveforms associated with the photodiode depicted in FIG. 2, in accordance with the present invention. Both the STEP1 and the STEP2 signals are square wave signals ranging from 0.0 volts to 2.0 volts. STEP1 signal goes high and upon its transition to low, STEP2 signal goes high. RESET$_H$ transitions from 0.0 volts 2.0 volts in response to the STEP1 signal and then from 2.0 volts to 4.0 volts in response to the STEP2 signal. Thus, the voltage across the photodiode rise from 0.0 volts to approximately 1.3 volts during the STEP1 signal and then rises from 1.3 volts to 3.3 volts during the STEP2 signal. By providing this two-step high voltage level shifter, the present invention prevents the gate oxide in the reset transistor from breaking down even when the potential on the gate is larger than the maximum supply voltage.

Figure 11:
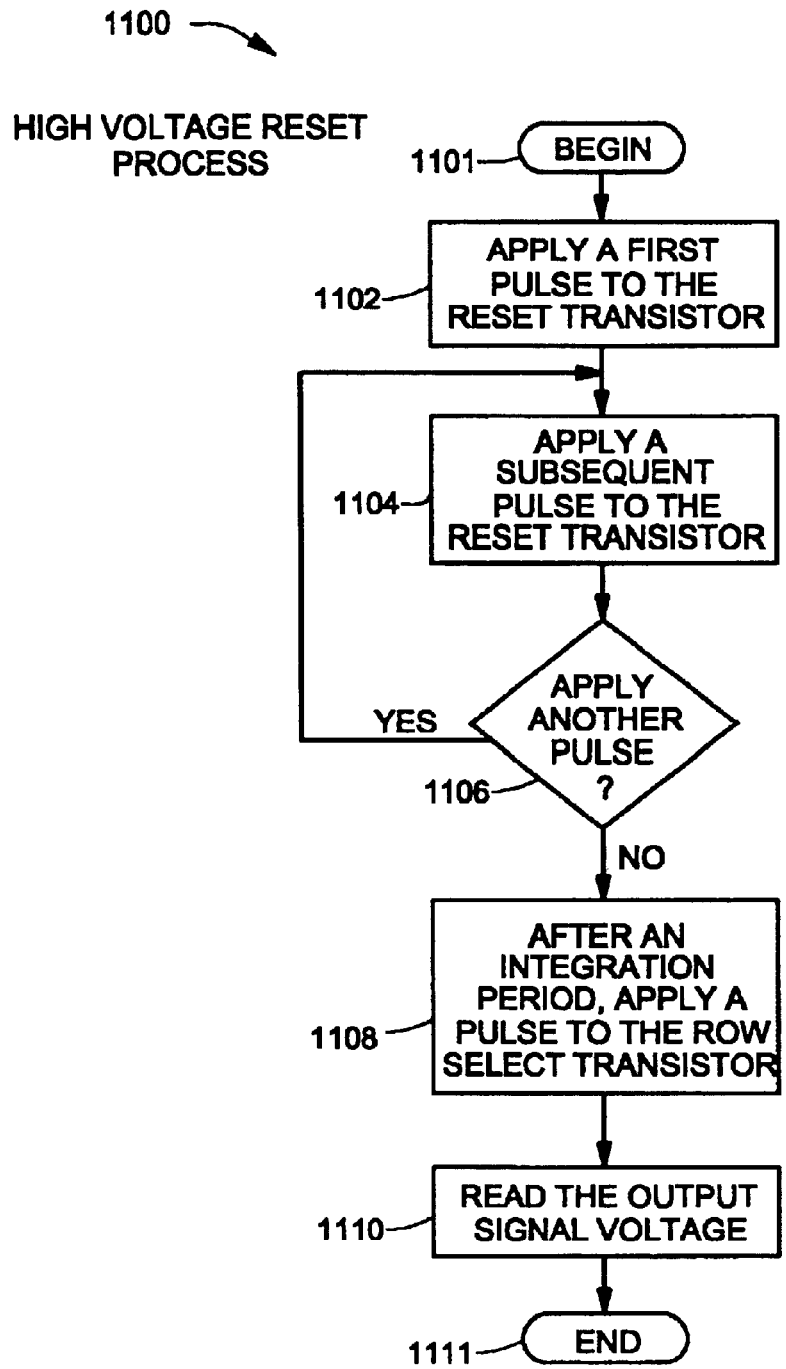
FIG. 11 is a flowchart illustrating one embodiment of the operational flow of several components of the image sensor for providing a high reset voltage in accordance with the present invention.

FIG. 11 is a flowchart generally illustrating a process 1100 for providing a high reset voltage, in accordance with one embodiment of the present invention. The process begins at block 1101 where the cathode voltage of the photodiode is in an initial state which may correspond to substantially zero volts.

At block 1102, a first reset voltage is applied to the reset transistor. For the 0.35 micron CMOS process example above, the first reset voltage may have a voltage up to or equal to the supply voltage (i.e., 3.3 volts). This causes the photodiode to charge up from its initial state to a first state (i.e., approximately 2.3 volts when the first reset voltage equals 3.3 volts for the 0.35 micron CMOS process). Processing continues at block 1104.

At block 1104, a subsequent voltage is applied to the reset transistor. In one embodiment, implementing a two-step process, the subsequent voltage may have a voltage equal to approximately two threshold voltages over the supply voltage (i.e., 4.5 volts in the 0.35 micron CMOS process). This causes the photodiode to charge up from its first state to a second state. In a two-step process, the second state may have a voltage substantially equal to the supply voltage associated with the CMOS fabrication process. Processing continues at decision block 1106.

At decision block 1106, a determination is made whether another subsequent voltage should be applied to the reset transistor before reading out the output signal voltage. Any number of incremental voltage increases may be applied to reach a final state that is associated with the supply voltage. In the two-step process, the second state is the final state. If additional incremental voltage increases are desired, the process loops back through block 1106 until no voltage increases are desired. At that point, processing continues at block 1108.

At block 1108, a pulse is applied to the row select transistor after a certain integration period. This allows the output signal voltage to appear at the column readout line. At block 1010, the output signal voltage is read through the source follower transistor on the column line at the source of the select transistor. Processing then ends at block 1011.

While the process 1100, as described above, implies incremental voltage increases for charging the photodiode to the supply voltage, one skilled in the art will appreciate that the process 1100 may use a gradually increasing subsequent voltage. As the number of incremental voltages increases is increased, the high voltage output becomes more gradual and eventually achieves a slow rise method. For this embodiment, during the gradual increase of the gate potential of the reset transistor, the reset transistor acts similar to a source follower. This allows the potential on the photodiode and the source of the reset transistor to follow the potential on the gate of the reset transistor less a threshold voltage. Thus, no damage occurs to the reset transistor because the voltage difference between the gate and the source of the reset transistor is not larger than the supply voltage at any time, even when the potential at the gate is larger than the supply voltage. For this gradually increasing subsequent voltage method, it is desirable to have the time constant of the reset process (i.e., the charging of the photodiode) slower than the rise time of the potential on the gate of the reset transistor (i.e., reset line). In the 0.35 micron fabrication process above referenced, this can be achieved because the photodiode consumes a small area on the CMOS chip and has little capacitance. Because the drain of the reset transistor is biased at the supply voltage (i.e., 3.3 volts) and the potential on the gate of the reset transistor varies between 0 volts when the reset transistor is inactive to 4.5 volts when it is pulled to its final state, the potential across the gate oxide on the drain side of the reset transistor varies between −3.3 volts and 1.2 volts. The absolute value of both these voltages does not exceed the maximum supply voltage. Thus, the high voltage reset method of the present invention will not damage the reset transistor on the drain side of the transistor either.

Using the high voltage reset methods of the present invention, the dynamic range of CMOS image sensors have experienced almost a 5 dB increase in the dynamic range. This allows digital cameras employing the teachings of the present invention to display better contrast for pictures taken with both dark and light areas (i.e., person standing in the shade). For example, a picture will show the person's face standing in the shade, along with a brighter object out of the shade.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A high voltage reset circuit for increasing a dynamic range of a CMOS image sensor, the high voltage reset circuit comprising:

a high voltage supply circuit for supplying a high supply voltage, the high supply voltage having a higher voltage level than a maximum supply voltage of an associated CMOS fabrication process used for the CMOS image sensor; and a high voltage level shifter circuit arranged to receive the high supply voltage and configured to output a high reset signal, the high voltage level shifter circuit being coupled to a gate of a reset transistor in a pixel circuit of a pixel array, the gate receives the high reset signal and maintains a gate to source potential less than the maximum supply voltage while a potential on a cathode of a photodiode, coupled to the reset transistor, charges up to a supply voltage of the associated CMOS fabrication process.

2. The high voltage reset circuit of claim 1, wherein the high voltage level shifter circuit comprises a plurality of dual gate oxide transistors on a dual gate oxide CMOS chip.

3. The high voltage reset circuit of claim 2, wherein the plurality of dual gate oxide transistors include two p-channel transistors, an input pair of n-channel transistors, and a p-channel transistor and an n-channel transistor configured as an inverter.

4. The high voltage reset circuit of claim 2, wherein the high supply voltage comprises a dual gate supply voltage associated with the plurality of dual gate oxide transistors.

5. The high voltage reset circuit of claim 1, wherein the high voltage level shifter circuit comprises a plurality of supertransistors.

6. The high voltage reset circuit of claim 5, wherein each of the plurality of supertransistors includes an input shielding transistor, a switching transistor, and an output shielding transistor.

7. The high voltage reset circuit of claim 1, wherein the high voltage supply circuit comprises a high voltage charge pump.

8. The high voltage reset circuit of claim 1, wherein the high reset signal comprises at least two voltage states, a first state having a first voltage level less than the maximum supply voltage and a final state having a final voltage level greater than the maximum supply voltage.

9. The high voltage reset circuit of claim 8, wherein the final voltage level is substantially equal to the sum of the maximum supply voltage and at least one threshold voltage of the reset transistor in the pixel circuit.

10. The high voltage reset circuit of claim 1, wherein the high reset signal comprises a gradually increasing voltage signal.

11. A high voltage reset method for increasing a dynamic range of a CMOS voltage sensor, the method comprising:

applying a fist voltage to a gate of a reset transistor of a pixel; and applying at least one subsequent voltage to the gate, each subsequent voltage having an increased voltage level, a final voltage out of the subsequent voltages having a voltage level greater than a maximum supply voltage associated with a CMOS fabrication process used in the CMOS image sensor, the first and subsequent voltages being applied in a manner to prevent gate oxide breakdown on the gate when the increased voltage level is above the maximum supply voltage associated with the CMOS fabrication process.

12. The high voltage reset method of claim 11, wherein the at least one subsequent voltage is one subsequent voltage that corresponds to the final voltage.

13. The high voltage reset method of claim 11, wherein the at least one subsequent voltage represents a gradually increasing voltage signal.

14. The high voltage reset method of claim 13, wherein the gradually increasing voltage signal has a slow low to high transition such that a potential on a photodiode in the pixel and a source of the reset transistor follow the first and subsequent voltages.

15. A circuit for increasing a dynamic range of an image sensor, comprising:

a means for generating a high supply voltage, the high supply voltage having a higher voltage level than a maximum supply voltage of an associated fabrication process used for the image sensor;

a means for receiving a reset signal; and a means for generating a high reset signal based on the reset signal and the high supply voltage, the high reset signal being coupled to a gate of a reset transistor a pixel circuit of a pixel array, the high reset signal allowing the reset transistor to maintain a gate to source potential less than the maximum supply voltage while a potential on a cathode of a photodiode, coupled to the reset transistor, charges up to a supply voltage associated with the associated fabrication process.

16. The circuit of claim 15, wherein the means for generating the high reset signal includes a high voltage level shifter circuit.

17. The circuit of claim 16, wherein the high volt age level shifter circuit includes a plurality of supertransistors.

18. The circuit of claim 16, wherein the high voltage level shifter circuit includes a plurality of dual gate oxide transistors on a dual gate oxide chip.

19. The circuit of claim 15, wherein the means for generating a high supply voltage includes a dual gate supply voltage associated with a plurality of dual gate oxide transistors.

20. The circuit of claim 15, wherein the high reset signal comprises at least tow voltage states, a first state having a first voltage level less than the maximum supply voltage and final state having a final voltage level greater than the maximum supply voltage.

21. The circuit of claim 15, wherein the high reset signal comprises a gradually increasing voltage signal.

* * * * *